(12) United States Patent
Kitabatake et al.

(10) Patent No.: US 9,457,790 B2
(45) Date of Patent: Oct. 4, 2016

(54) POWER TRANSMISSION DEVICE

(71) Applicants: Hirotatsu Kitabatake, Susono (JP);
Yosuke Suzuki, Susono (JP); Yuji Iwase, Mishima (JP)

(72) Inventors: Hirotatsu Kitabatake, Susono (JP);
Yosuke Suzuki, Susono (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/649,066

(22) PCT Filed: Dec. 6, 2012

(86) PCT No.: PCT/JP2012/081620
§ 371 (c)(1),
(2) Date: Jun. 2, 2015

(87) PCT Pub. No.: WO2014/087513
PCT Pub. Date: Jun. 12, 2014

(65) Prior Publication Data
US 2015/0314770 A1    Nov. 5, 2015

(51) Int. Cl.
*H02P 15/02* (2006.01)
*B60W 10/18* (2012.01)
*F16H 63/48* (2006.01)
(Continued)

(52) U.S. Cl.
CPC ............ *B60W 10/182* (2013.01); *B60K 6/383* (2013.01); *B60K 6/445* (2013.01); *B60L 11/14* (2013.01); *B60L 15/2054* (2013.01); *B60T 1/005* (2013.01); *B60T 1/06* (2013.01); *B60T 1/062* (2013.01); *B60W 10/08* (2013.01); *B60W 10/18* (2013.01); *B60W 20/00* (2013.01); *B60W 30/184* (2013.01); *F16D 63/006* (2013.01); *F16H 63/48* (2013.01); *B60L 2240/421* (2013.01); *B60L 2240/423* (2013.01); *B60L 2240/441* (2013.01); *B60L 2240/443* (2013.01); *B60L 2240/507* (2013.01); *Y02T 10/6239* (2013.01); *Y02T 10/645* (2013.01); *Y02T 10/70* (2013.01); *Y02T 10/7077* (2013.01); *Y02T 10/72* (2013.01); (Continued)

(58) Field of Classification Search
None
See application file for complete search history.

(56) References Cited

U.S. PATENT DOCUMENTS 5,788,006 A     8/1998  Yamaguchi
8,645,037 B2 *  2/2014  Kato .................... B60K 6/445
                                                          477/194

(Continued)

FOREIGN PATENT DOCUMENTS

JP      8-295140 A      11/1996
JP     2009-113742 A     5/2009

OTHER PUBLICATIONS

International Search Report Issued Jan. 15, 2013 in PCT/JP12/081620 Filed Dec. 6, 2012.

*Primary Examiner* — Dirk Wright
(74) *Attorney, Agent, or Firm* — Oblon, McClelland, Maier & Neustadt, L.L.P.

(57) ABSTRACT

A power transmission device includes: a planetary gear mechanism; a first rotary machine connected to a sun gear of the planetary gear mechanism; an engine and a one-way clutch that are connected to a carrier of the planetary gear mechanism; a second rotary machine and a drive wheel that are connected to a ring gear of the planetary gear mechanism; and a parking device connected to the ring gear. The power transmission device is configured to positively rotate the first rotary machine at a time a command to disengage the parking device is received and thereafter disengage the parking device, and a direction of the positive rotation is a rotational direction of the carrier rotary-driven by the engine.

3 Claims, 7 Drawing Sheets

(51) Int. Cl.
  *B60W 30/184* (2012.01)
  *B60K 6/445* (2007.10)
  *B60L 11/14* (2006.01)
  *B60W 10/08* (2006.01)
  *B60W 20/00* (2016.01)
  *B60L 15/20* (2006.01)
  *B60K 6/383* (2007.10)
  *B60T 1/00* (2006.01)
  *B60T 1/06* (2006.01)
  *F16D 63/00* (2006.01)

(52) U.S. Cl.
  CPC .......... *Y02T 10/7275* (2013.01); *Y10S 903/93* (2013.01); *Y10T 477/322* (2015.01)

(56) References Cited

U.S. PATENT DOCUMENTS

| | | | |
|---|---|---|---|
| 9,114,700 B2* | 8/2015 | Park | B60K 6/547 |
| 9,132,810 B2* | 9/2015 | Shioiri | B60K 6/22 |
| 9,227,636 B2* | 1/2016 | Yamamoto | B60W 10/182 |
| 2005/0159861 A1 | 7/2005 | Iwatsuki et al. | |
| 2009/0043465 A1 | 2/2009 | Tomita | |
| 2015/0011359 A1* | 1/2015 | Maruyama | B60K 6/445 477/4 |
| 2015/0057126 A1* | 2/2015 | Harada | B60K 6/445 477/4 |
| 2015/0298534 A1* | 10/2015 | Kitabatake | B60K 6/445 477/4 |

* cited by examiner

| EV TRAVEL MODE | MG1 | MG2 | B | REMARKS |
|---|---|---|---|---|
| MG2 DRIVE | × | ○ | × | @EV1/HV MODE |
| ↑ | × | ○ | (○) | @EV1 MODE |
| MG1 AND MG2 BOTH DRIVE | ○ | ○ | ○ | @EV2 MODE |

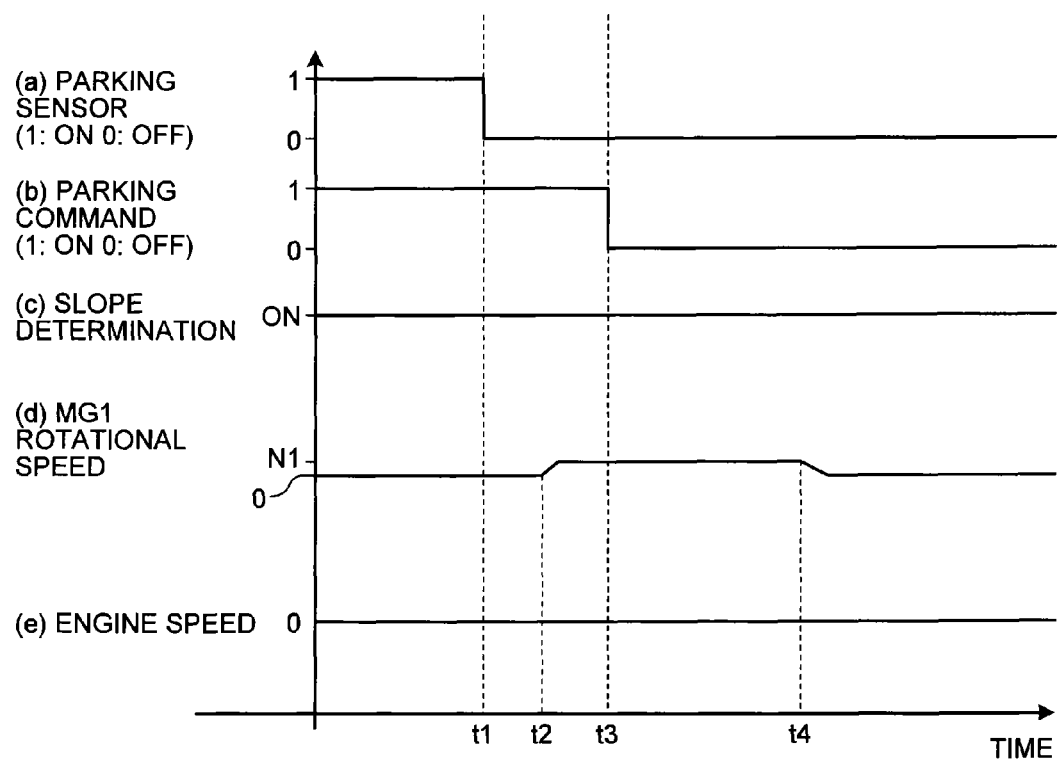

POWER TRANSMISSION DEVICE

FIELD

The present invention relates to a power transmission device.

BACKGROUND

There conventionally is a power transmission device provided with a one-way clutch. For example, Patent Literature 1 discloses a hybrid vehicle including an internal-combustion engine, an electric device to which rotation from the internal-combustion engine is input, an electric motor driven by a supplied current, a differential gear device including at least three gear elements, a first gear element coupled to the electric device, a second gear element coupled to an output shaft, and a third gear element coupled to the internal-combustion engine, and braking means which stops rotation of the third gear element.

CITATION LIST

Patent Literature

Patent Literature 1: Japanese Patent Application Laid-open No. 8-295140

SUMMARY

Technical Problem

Herein, there is a case in which torque is input to a one-way clutch when a parking device is disengaged such as when the parking device is engaged on a slope and the like. It is desirable to inhibit the input of the torque to the one-way clutch.

An object of the present invention is to provide the power transmission device capable of inhibiting the input of the torque to the one-way clutch when the parking device is disengaged.

Solution to Problem

A power transmission device according to the present invention includes: a planetary gear mechanism; a first rotary machine connected to a sun gear of the planetary gear mechanism; an engine and a one-way clutch that are connected to a carrier of the planetary gear mechanism; a second rotary machine and a drive wheel that are connected to a ring gear of the planetary gear mechanism; and a parking device connected to the ring gear, the power transmission device is configured to positively rotate the first rotary machine and disengage the parking device at a time a command to disengage the parking device is received, and a direction of the positive rotation is a rotational direction of the carrier rotary-driven by the engine.

In the above-described power transmission device, it is preferable to positively rotate the first rotary machine and disengage the parking device at a time the command to disengage the parking device is received on a climbing road.

In the above-described power transmission device, it is preferable to further include: an actuator that disengages the parking device; and a controller configured to electrically control the actuator, and preferable that the controller positively rotates the first rotary machine and disengages the parking device by the actuator at the time the command to disengage the parking device is received.

Advantageous Effects of Invention

A power transmission device according to the present invention positively rotates a first rotary machine and disengages a parking device when a command to disengage the parking device is received, wherein a direction of the positive rotation is a rotational direction of a carrier rotary-driven by an engine. The power transmission device according to the present invention has an effect of inhibiting an input of torque to a one-way clutch when the parking device is disengaged.

BRIEF DESCRIPTION OF DRAWINGS

FIG. 10 is a time chart regarding the control of the embodiment.

DESCRIPTION OF EMBODIMENTS

A power transmission device according to an embodiment of the present invention is hereinafter described in detail with reference to the drawings. Meanwhile, the present invention is not limited by the embodiment. Components in the following embodiment include a component easily conceived of by one skilled in the art or a substantially identical component.

[Embodiment]

Figure 1:
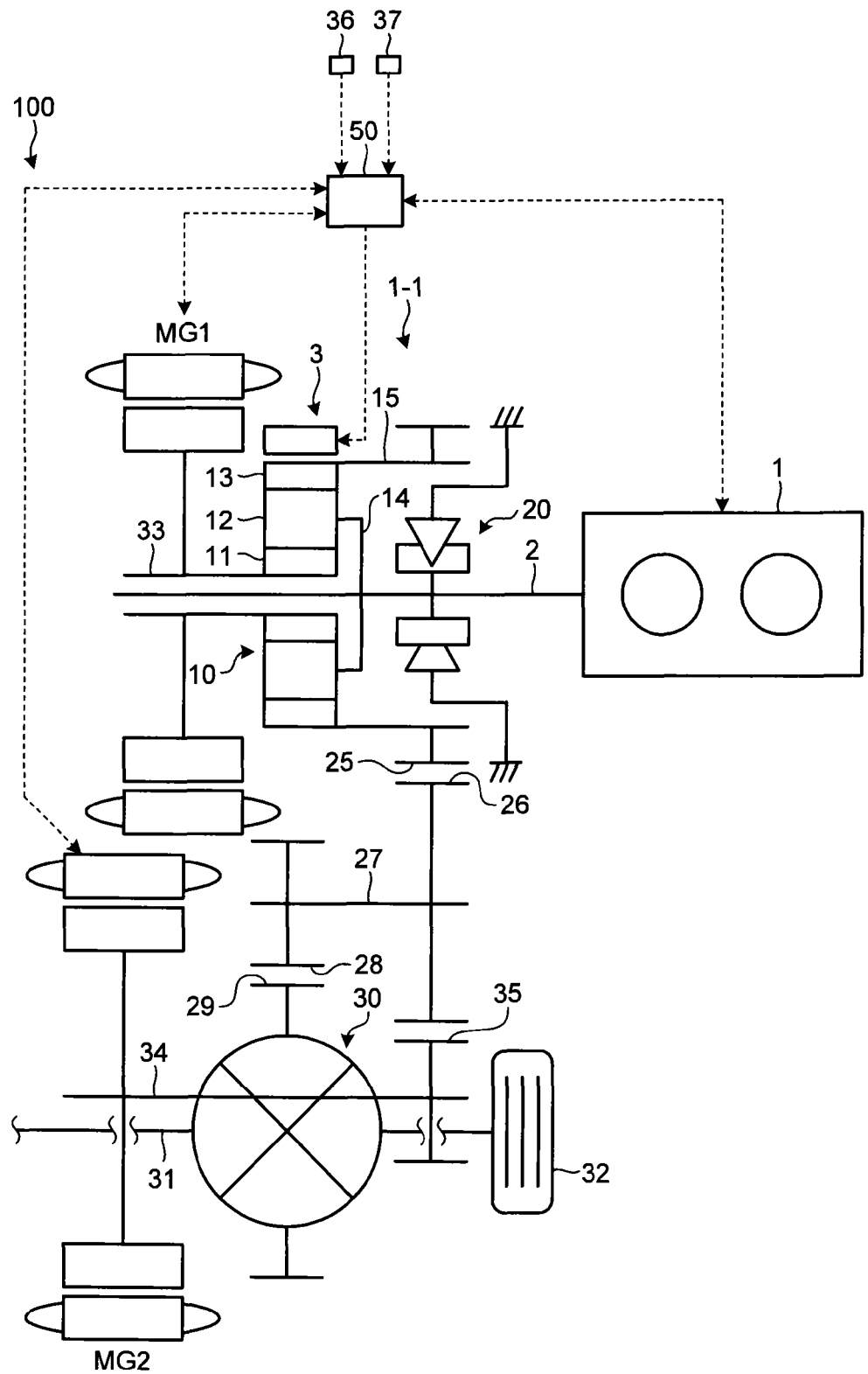
FIG. 1 is a skeleton diagram of a vehicle according to an embodiment.
Figure 2:
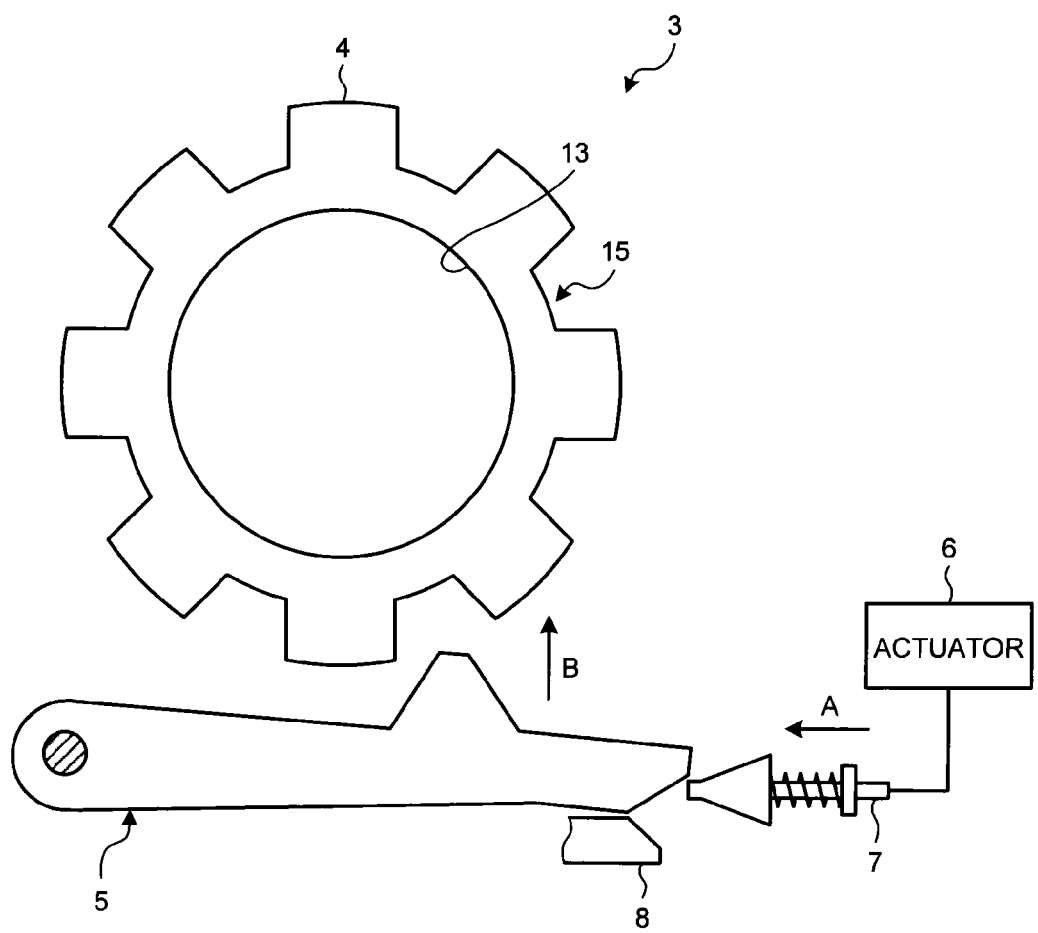
FIG. 2 is a schematic configuration diagram of a parking device according to the embodiment.
Figures 3, 4:
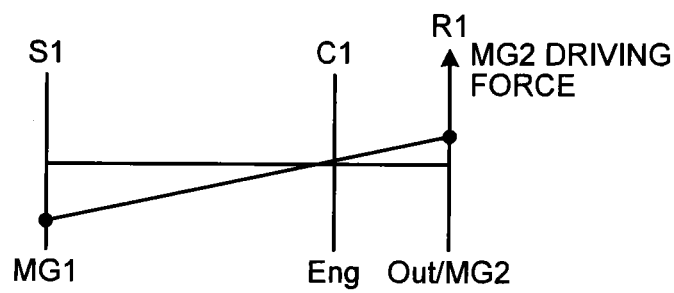
FIG. 3 is a view illustrating an operation engagement table of the power transmission device according to the embodiment.
FIG. 4 is an alignment chart regarding a single drive EV mode.
Figure 5:
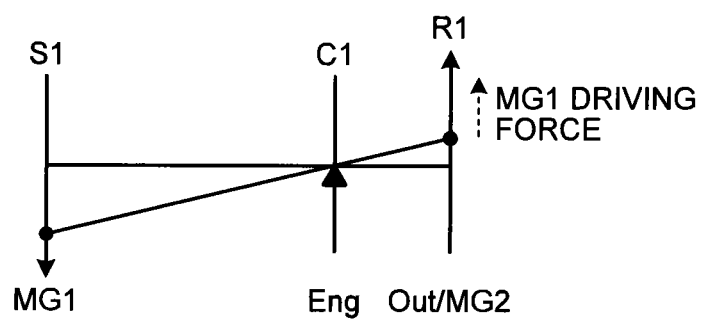
FIG. 5 is an alignment chart regarding a both drive EV mode.
Figure 6:
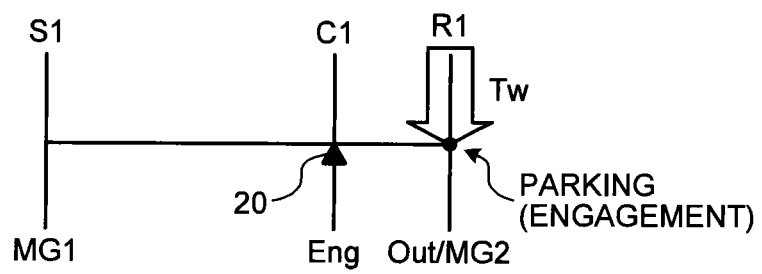
FIG. 6 is an illustrative diagram of torque acting at the time of parking engagement.
Figure 7:
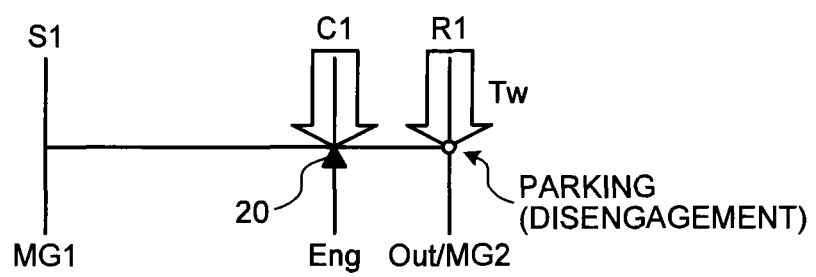
FIG. 7 is an illustrative diagram of the torque acting at the time of parking disengagement.
Figure 8:
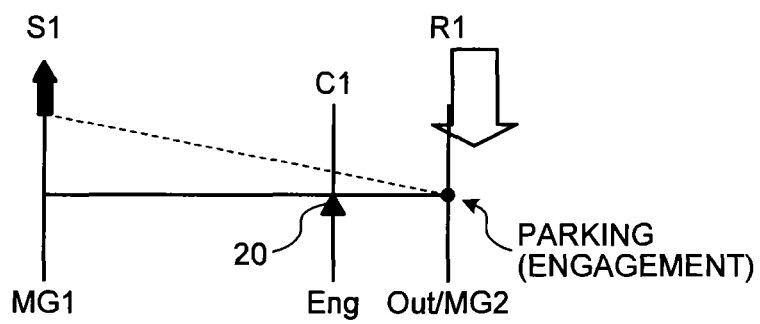
FIG. 8 is an alignment chart illustrating operation at the time of the parking disengagement according to the embodiment.
Figure 9:
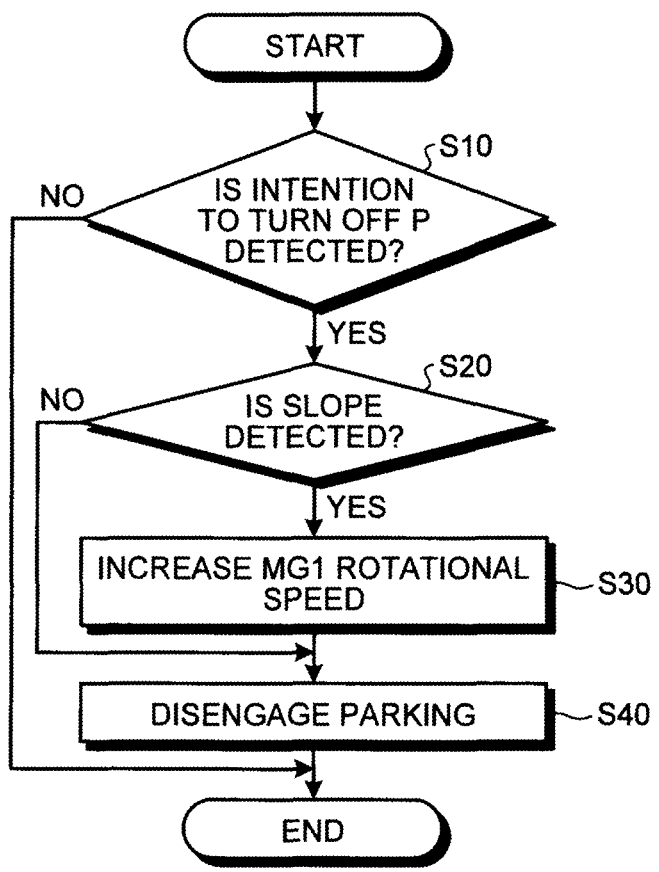
FIG. 9 is a flowchart regarding control of the embodiment.

An embodiment is described with reference to FIGS. 1 to 10. This embodiment relates to a power transmission device. FIG. 1 is a skeleton diagram of a vehicle according to the embodiment, FIG. 2 is a schematic configuration diagram of a parking device according to the embodiment, FIG. 3 is a view illustrating an operation engagement table of the power transmission device according to the embodiment, FIG. 4 is an alignment chart regarding a single drive EV mode, FIG. 5 is an alignment chart regarding a both drive EV mode, FIG. 6 is an illustrative diagram of torque acting at the time of parking engagement, FIG. 7 is an illustrative diagram of the torque acting at the time of parking disengagement, FIG. 8 is an alignment chart illustrating operation at the time of the parking disengagement according to the embodiment, FIG. 9 is a flowchart regarding control of the embodiment, and FIG. 10 is a time chart regarding the control of the embodiment.

A vehicle 100 according to this embodiment includes a one-way clutch 20 which fixes an engine input element of a planetary gear mechanism 10. The vehicle 100 is equipped with a HV system having an EV travel mode in which an engine 1 is stopped, the one-way clutch 20 is fixed, and it is driven by using both of a first rotary machine MG1 and a second rotary machine MG2.

When a parking device 3 is disengaged from a state in which the parking device 3 is engaged on a slope, torsional torque is transmitted to an input shaft 2 through the planetary gear mechanism 10 and large torque might be input to the one-way clutch 20. For this, a power transmission device 1-1 according to this embodiment positively rotates the first rotary machine MG1 when a command to disengage the parking device 3 is received as illustrated in FIG. 8. According to this, the input of the torque to the one-way clutch 20 when the parking device 3 is disengaged is inhibited.

As illustrated in FIG. 1, the vehicle 100 is a hybrid vehicle (HV) including the engine 1, the first rotary machine MG1, and the second rotary machine MG2 as power sources. The vehicle 100 may also be a plug-in hybrid vehicle (PHV) which may be charged by an external power source. The vehicle 100 includes the planetary gear mechanism 10, the one-way clutch 20, the parking device 3, and a drive wheel 32 in addition to the above-described power sources.

The power transmission device 1-1 according to this embodiment includes the engine 1, the planetary gear mechanism 10, the first rotary machine MG1, the second rotary machine MG2, the one-way clutch 20, the parking device 3, and the drive wheel 32. The power transmission device 1-1 may further include an ECU 50. The power transmission device 1-1 is applicable to a front-engine front-wheel drive (FF) vehicle, a rear-engine rear-wheel drive (RR) vehicle or the like. The power transmission device 1-1 is mounted on the vehicle 100 such that an axial direction thereof coincides with a vehicle width direction, for example.

The engine 1 being an engine converts combustion energy of fuel to rotational motion of an output shaft to output. The output shaft of the engine 1 is connected to the input shaft 2. The input shaft 2 is arranged coaxially with the output shaft of the engine 1 along its extension. The input shaft 2 is connected to a carrier 14 of the planetary gear mechanism 10.

The planetary gear mechanism 10 being a single pinion type includes a sun gear 11, a pinion gear 12, a ring gear 13, and the carrier 14. The ring gear 13 is arranged coaxially with the sun gear 11 on an outer side of the sun gear 11 in a radial direction. The pinion gear 12 is arranged between the sun gear 11 and the ring gear 13 to mesh with the sun gear 11 and the ring gear 13. The pinion gear 12 is rotatably supported by the carrier 14. The carrier 14 is coupled to the input shaft 2 and integrally rotates with the input shaft 2. Therefore, the pinion gear 12 may rotate (revolve) around a central axis of the input shaft 2 together with the input shaft 2 and may rotate (rotate) around a central axis of the pinion gear 12 while being supported by the carrier 14.

A rotary shaft 33 of the first rotary machine MG1 is connected to the sun gear 11. A rotor of the first rotary machine MG1 is connected to the sun gear 11 through the rotary shaft 33 and integrally rotates with the sun gear 11. A counter drive gear 25 is connected to the ring gear 13. The counter drive gear 25 is an output gear which integrally rotates with the ring gear 13. The counter drive gear 25 and the ring gear 13 are provided on an outer peripheral surface and an inner peripheral surface of a cylindrical member 15 in a cylindrical shape.

The counter drive gear 25 meshes with a counter driven gear 26. The counter driven gear 26 is connected to a drive pinion gear 28 through a counter shaft 27. The counter driven gear 26 and the drive pinion gear 28 integrally rotate with each other. A reduction gear 35 meshes with the counter driven gear 26. The reduction gear 35 is connected to a rotary shaft 34 of the second rotary machine MG2. That is to say, rotation of the second rotary machine MG2 is transmitted to the counter driven gear 26 through the reduction gear 35. The reduction gear 35 having a smaller diameter than that of the counter driven gear 26 decelerates the rotation of the second rotary machine MG2 to transmit to the counter driven gear 26.

The drive pinion gear 28 meshes with a differential ring gear 29 of a differential device 30. The differential device 30 is connected to the drive wheels 32 through right and left drive shafts 31. The ring gear 13 is connected to the drive wheel 32 through the counter drive gear 25, the counter driven gear 26, the drive pinion gear 28, the differential device 30, and the drive shaft 31. The second rotary machine MG2 is connected to a power transmission path between the ring gear 13 and the drive wheel 32 and may transmit power to the ring gear 13 and the drive wheel 32.

Each of the first and second rotary machines MG1 and MG2 has a function as a motor (electric motor) and a function as a power generator. The first and second rotary machines MG1 and MG2 are connected to a battery through an inverter. The first and second rotary machines MG1 and MG2 may convert electric power supplied from the battery to mechanical power to output and may be driven by input power to convert the mechanical power to the electric power. The electric power generated by the rotary machines MG1 and MG2 may be accumulated in the battery. An AC synchronous motor generator may be used, for example, as the first and second rotary machines MG1 and MG2.

In the vehicle 100 of this embodiment, the one-way clutch 20, the counter drive gear 25, the planetary gear mechanism 10, and the first rotary machine MG1 are arranged in this order from a side closer to the engine 1 so as to be coaxially with the engine 1. The power transmission device 1-1 of this embodiment is a pluriaxial type in which the input shaft 2 and the rotary shaft 34 of the second rotary machine MG2 are arranged on different axes.

The one-way clutch 20 is provided on the input shaft 2. The one-way clutch 20 is a regulation mechanism which regulates rotation of the carrier 14. The one-way clutch 20 allows rotation of the input shaft 2 in a positive direction being a rotational direction of the input shaft 2 when the engine 1 is operated and regulates the rotation thereof in a negative direction.

The parking device 3 is a regulation device which regulates rotation of the power transmission path of the power transmission device 1-1. The parking device 3 regulates the rotation of the power transmission path which connects the ring gear 13 and the drive wheel 32. The parking device 3 of this embodiment is connected to the ring gear 13 and regulates rotation of the cylindrical member 15 including the ring gear 13. As illustrated in FIG. 2, the parking device 3 includes a parking gear 4, a parking pole 5, and an actuator 6.

The parking gear 4 is provided on the outer peripheral surface of the cylindrical member 15. The parking pole 5 is provided so as to be movable between a locking position in which this meshes with the parking gear 4 to disable rotation of the drive wheel 32 and an unlocking position in which this does not mesh with the parking gear 4 to allow the rotation of the drive wheel 32. FIG. 2 illustrates the parking pole 5 in the unlocking position. The parking pole 5 receives energizing force in a direction from the locking position toward the unlocking position by an energizing member such as a spring. The actuator 6 may move the parking pole 5 from the unlocking position to the locking position to engage the parking device 3 and may move the parking pole 5 from the locking position to the unlocking position to disengage the parking device 3.

The actuator 6 moves a rod 7 in an engaging direction indicated by arrow A in FIG. 2 when engaging the parking device 3. According to this, a tapered portion at the tip of the rod 7 enters between the parking pole 5 and a support member 8 to press the parking pole 5 against the parking gear 4. The parking pole 5 pressed by the rod 7 moves as indicated by arrow B in FIG. 2 and meshes with the parking gear 4 to regulate rotation of the parking gear 4.

In contrast, when the actuator 6 disengages the parking device 3, this moves the rod 7 in a direction opposite to the engaging direction indicated by arrow A. According to this, the parking pole 5 moves to the unlocking position by the energizing force of the energizing member and the parking device 3 is disengaged.

With reference to FIG. 1 again, the ECU 50 has a function as a control device which controls the vehicle 100. The ECU 50 being an electronic control unit having a computer controls the engine 1, the first rotary machine MG1, the second rotary machine MG2, and the parking device 3. Signals indicating various pieces of information such as information regarding the engine 1, information regarding the first rotary machine MG1, information regarding the second rotary machine MG2, information regarding a vehicle speed, information regarding the battery, and information regarding an operation input to an operation device such as an accelerator opening degree are input to the ECU 50.

The ECU 50 is electrically connected to a parking sensor 36 and may obtain the operation input to a parking button not illustrated. The parking sensor 36 outputs a signal indicating that a state of the parking button is 1 when there is the operation input to engage the parking device 3 to the parking button. When the signal indicating that the state of the parking button is 1 is output from the parking sensor 36, the ECU 50 detects the signal as a command to engage the parking device 3 (hereinafter, also referred to as "engagement command"). When the ECU 50 detects the engagement command, this outputs a command to move the parking pole 5 to the locking position to the actuator 6 of the parking device 3.

When there is the operation input to disengage the parking device 3 to the parking button, the parking sensor 36 outputs a signal indicating that the state of the parking button is 0. When the signal indicating that the state of the parking button is 0 is output from the parking sensor 36, the ECU 50 detects the signal as a command of a driver to disengage the parking device 3 (hereinafter, also referred to as "disengagement command"). When the ECU 50 detects the disengagement command, this outputs a command to move the parking pole 5 to the unlocking position to the actuator 6 of the parking device 3.

The ECU 50 is electrically connected to a longitudinal G sensor 37. The longitudinal G sensor 37 is a sensor which detects acceleration in a longitudinal direction of the vehicle 100. The ECU 50 may determine that the vehicle stops on the slope based on longitudinal G of the vehicle 100, input torque, the vehicle speed, information regarding an accelerator, information regarding a brake and the like. For example, the ECU 50 may obtain an inclination angle in the longitudinal direction of the vehicle 100, in other words, a gradient of a road surface on which the vehicle 100 stops based on a signal output from the longitudinal G sensor 37 at the time of vehicle stop at the vehicle speed of 0.

The vehicle 100 may selectively execute hybrid (HV) travel or EV travel. The HV travel is a travel mode in which the vehicle 100 travels by using the engine 1 as the power source. In the HV travel, the second rotary4 machine MG2 may be used as the power source in addition to the engine 1.

The EV travel is the travel mode in which the vehicle travels by using at least any one of the first and second rotary machines MG1 and MG2 as the power source. In the EV travel, it is possible to travel with the engine 1 stopped. The power transmission device 1-1 according to this embodiment has a single drive EV mode (single motor EV mode) in which the vehicle 100 travels by using the second rotary machine MG2 as a single power source and a both drive EV mode (both motor EV mode) in which the vehicle 100 travels by using the first and second rotary machines MG1 and MG2 as the power sources as the EV travel mode. Meanwhile, the single drive EV mode is also referred to as "EV1 mode" and the both drive EV mode is also referred to as "EV2 mode" in this specification.

In the engagement table in FIG. 3, a mark ○ in columns of the first and second rotary machines MG1 and MG2 indicates that torque for travel is output and a mark x indicates that the torque for travel is not output, that is to say, the torque is not output, or the torque not for travel is output, or regeneration is performed. A column "B" indicates a state of the one-way clutch 20 in which the mark ○ indicates the engagement and the mark x indicates the disengagement. Herein, the engagement or the disengagement of the one-way clutch 20 is not directly controlled but is generated according to a rotational state of the input shaft 2.

In the HV mode, the engine 1 rotates and the input shaft 2 positively rotates, so that the one-way clutch 20 is put into the disengaged state. The single drive EV mode (EV1 mode) illustrated in FIG. 4 may be executed regardless of whether the one-way clutch 20 is in the disengaged state or in the engaged state. In each alignment chart, a rotational speed of the sun gear 11 and the first rotary machine MG1 is plotted along an axis Sl.

A rotational speed of the carrier 14 and the engine 1 is plotted along an axis C1, and a rotational speed of the ring gear 13 is plotted along an axis R1. The rotational speed of the ring gear 13 is proportional to a rotational speed of the second rotary machine MG2 and a rotational speed of the drive shaft 31.

In the both drive EV mode (EV2 mode) illustrated in FIG. 5, the one-way clutch 20 is put into the engaged state. In the both drive EV mode, the first rotary machine MG1 outputs negative torque at the time of forward movement. The one-way clutch 20 is engaged to regulate the rotation of the carrier 14, thereby acting as a reaction force receiver of output torque of the first rotary machine MG1 (MG1 torque) to output positive torque according to the MG1 torque from the ring gear 13. The positive torque output from the ring gear 13 is transmitted to the drive wheel 32 to generate driving force to drive the vehicle 100 to move forward.

Herein, there is a case in which the torque is input to the one-way clutch 20 when the parking device 3 is disengaged on the slope as described hereinafter with reference to FIGS. 6 and 7. When the parking device 3 is engaged on the slope, torsional torque Tw acts on the parking device 3 as illustrated in FIG. 6. On a climbing road, torque in a direction to allow the vehicle 100 to move rearward acts on the drive wheel 32. According to this, torsion occurs in the power transmission path between the drive wheel 32 and the parking device 3 and the torsional torque Tw is input to the parking device 3.

When the parking device 3 is disengaged from this state, the torsional torque Tw is transmitted from the ring gear 13 to the carrier 14 to be input to the one-way clutch 20 as illustrated in FIG. 7. There might be a countermeasure to strengthen the one-way clutch 20 for such input of the torsional torque Tw, but this might make the device large and increase a cost thereof.

When the command to disengage the parking device 3 is received, the power transmission device 1-1 according to this embodiment positively rotates the first rotary machine MG1 and disengages the parking device 3. According to this, the input of the torque to the one-way clutch 20 when the parking device 3 is disengaged is inhibited.

Operation of the power transmission device 1-1 of this embodiment is described with reference to FIGS. 8 to 10. In the time chart in FIG. 10, the signal output from the parking sensor 36 which indicates the state of the parking button is indicated by (a). A parking command from the ECU 50 to the actuator 6 of the parking device 3 is indicated by (b) in which a command signal 1 is the command to engage the parking device 3 and a command signal 0 is the command to disengage the parking device 3. A slope determination result is indicated by (c) and this is set to ON when the road surface gradient calculated based on the longitudinal G detected by the longitudinal G sensor 37 is a value indicating the climbing road at a predetermined angle or larger, for example. The MG1 rotational speed indicating the rotational speed of the first rotary machine MG1 is indicated by (d). In the MG1 rotational speed, the positive rotation indicates the rotation in the same direction as a rotational direction of the carrier 14 rotary-driven by the engine 1. The engine speed is indicated by (e).

FIG. 10 illustrates the operation when the disengagement command to the parking device 3 is detected from the state in which the parking device 3 is engaged on the climbing road. The flowchart illustrated in FIG. 9 is repeatedly executed at a predetermined interval when the parking device 3 is engaged, for example.

It is determined whether an intention to turn off the parking device 3 is detected by the ECU 50 at step S10. The ECU 50 performs determination at step S10 based on the signal output from the parking sensor 36. When the signal output from the parking sensor 36 is switched from the command to engage the parking device 3 by the driver (1: ON) to the command to disengage the parking device 3 by the driver (0: OFF), it is positively determined at step S10. In FIG. 10, the signal of the parking sensor 36 changes from 1 (engagement command) to 0 (disengagement command) at time t1. Therefore, it is positively determined at step S10 after the time t1. As a result of the determination at step S10, when it is determined that the intention to turn off the parking device 3 is detected (step S10-Y), the procedure shifts to step S20, and otherwise (step S10-N), this control flow is finished.

It is determined whether the slope is detected by the ECU 50 at step S20. The ECU 50 positively determines at step S20 when the slope determination result is set to ON, for example. In FIG. 10, the slope determination is set to ON and it is positively determined at step S20. As a result of the determination at step S20, when it is determined that the slope is detected (step S20-Y), the procedure shifts to step S30, and otherwise (step S20-N), the procedure shifts to step S40.

At step S30, the MG1 rotational speed is increased by the ECU 50. The ECU 50 generates the positive torque on the first rotary machine MG1 to positively rotate the first rotary machine MG1. According to this, the carrier 14 positively rotates as illustrated in FIG. 8. In FIG. 10, the MG1 rotational speed starts increasing at time t2. When the MG1 rotational speed increases to a target rotational speed N1, the MG1 rotational speed is maintained at N1. When step S30 is executed, the procedure shifts to step S40.

At step S40, the parking device 3 is released (disengaged) by the ECU 50. The ECU 50 outputs the command to disengage the parking device 3 to the actuator 6 of the parking device 3. In FIG. 10, the parking command to the actuator 6 is switched from 1 (engagement) to 0 (disengagement) at time t3. The actuator 6 moves the parking pole 5 from the locking position to the unlocking position according to the disengagement command from the ECU 50 to disengage the parking device 3. At that time, the carrier 14 positively rotates, so that the engagement of the one-way clutch 20 is inhibited even if the parking device 3 is disengaged and the torsional torque Tw is transmitted to the carrier 14. Therefore, a load applied to the one-way clutch 20 due to the torque input to the one-way clutch 20 at the time of the disengagement of the parking device 3 is inhibited. When step S40 is executed, this control flow is finished.

When the parking device 3 is disengaged, the ECU 50 sets the MG1 rotational speed to 0. In FIG. 10, the ECU 50 outputs a command to set the MG1 rotational speed to 0 at time t4 after it is detected that the parking pole 5 is in the unlocking position.

As described above, when the command to disengage the parking device 3 is received, the power transmission device 1-1 according to this embodiment positively rotates the first rotary machine MG1 and disengages the parking device 3. Therefore, it is possible to inhibit the input of the torque to the one-way clutch 20 when the parking device 3 is disengaged. For example, an effect of inhibiting an excessive load on the one-way clutch 20 due to excessive torque applied to the one-way clutch 20 when the parking device 3 is disengaged is expected. The power transmission device 1-1 according to this embodiment may improve durability of the one-way clutch 20.

The power transmission device 1-1 according to this embodiment positively rotates the first rotary machine MG1 and disengages the parking device 3 when the command to disengage the parking device 3 is received on the climbing road. It is possible to advance disengaging timing of the parking device 3 by omitting the control to positively rotate the first rotary machine MG1 on a flat road and a descending road. It is possible to suppress power consumption by omitting the control to positively rotate the first rotary machine MG1 when climbing road determination is not performed.

The power transmission device 1-1 according to this embodiment is provided with the actuator 6 which disengages the parking device 3 and the ECU 50 (control device) which electrically controls the actuator 6, in which the ECU 50 positively rotates the first rotary machine MG1 and disengages the parking device 3 by the actuator 6 when the command to disengage the parking device 3 is received. In the power transmission device 1-1 having a configuration to control the parking device 3 by so-called shift by wire, it is easy to control to positively rotate the first rotary machine MG1 after the ECU 50 detects the disengagement command by the driver until this outputs the command to disengage the parking device 3 to the actuator 6 and it is possible to more surely inhibit the torque input to the one-way clutch 20 when the parking device 3 is disengaged.

[First Variation of Embodiment]

Although a power transmission device 1-1 positively rotates a first rotary machine MG1 and disengages a parking device 3 when a command to disengage the parking device 3 is received on a slope in the above-described embodiment, it is also possible to positively rotate the first rotary machine MG1 and disengage the parking device 3 when the command to disengage the parking device 3 is received also when the vehicle is not stopped on the slope.

It is also possible to positively rotate the first rotary machine MG1 and disengage the parking device 3 when the command to disengage the parking device 3 is received not only on a climbing road but also on a descending road. For example, the power transmission device 1-1 might have a configuration that torque generated on a power transmission path when the parking device 3 is engaged on the descending road is the torque in a direction to engage a one-way clutch 20. Such power transmission device 1-1 may inhibit a torque input to the one-way clutch 20 when the parking device 3 is disengaged by positively rotating the first rotary machine MG1 and disengaging the parking device 3 when the command to disengage the parking device 3 is received on the descending road.

[Second Variation of Embodiment]

Although a power transmission device 1-1 positively rotates a first rotary machine MG1 (step S30) and thereafter disengages a parking device 3 when a command to disengage the parking device 3 is received (step S10-Y) in the above-described embodiment (refer to FIG. 9), it is also possible to positively rotate the first rotary machine MG1 and disengage the parking device 3 at the same time in place of this. For example, the ECU 50 may also simultaneously output a command to positively rotate the first rotary machine MG1 and a command to disengage the parking device 3.

[Third Variation of Embodiment]

Although engagement and disengagement of a parking device 3 are electrically controlled in the above-described embodiment, the parking device 3 which is mechanically engaged and disengaged by wire and the like in conjunction with shift operation may also be mounted on a vehicle 100 in place of this. In this case, it is also possible to detect or predict a command to disengage the parking device 3 based on a detection result of a sensor which detects the shift operation, for example. For example, it is also possible to detect or predict the disengagement command of a driver to the parking device 3 to positively rotate a first rotary machine MG1 when detecting operation to move a shift lever from parking (P).

[Fourth Variation of Embodiment]

Although an engine is an engine 1 in the above-described embodiment, another engine may also be mounted on a vehicle 100 in place of the engine 1. Although a parking device 3 is provided on a cylindrical member 15 in the above-described embodiment, the parking device 3 may also be arranged in another position. The parking device 3 may regulate rotation of a rotary shaft 34 of a second rotary machine MG2, for example. That is to say, the parking device 3 may be directly connected to a ring gear 13 or connected thereto through a gear mechanism and the like. Although an operation command such as an engagement command and a disengagement command of the parking device 3 is received through a parking button in the above-described embodiment, the operation command is not limited to that received through the parking button and may be an operation input to a shift lever and the like, the operation command through a touch panel, and the operation command by voice, for example.

The contents disclosed in the above-described embodiment and variations may be appropriately combined to be executed.

REFERENCE SIGNS LIST 1-1 POWER TRANSMISSION DEVICE
1 ENGINE
3 PARKING DEVICE
10 PLANETARY GEAR MECHANISM
11 SUN GEAR
12 PINION GEAR
13 RING GEAR
14 CARRIER
20 ONE-WAY CLUTCH
32 DRIVE WHEEL
36 PARKING SENSOR
37 LONGITUDINAL G SENSOR
50 ECU
100 VEHICLE

The invention claimed is:

1. A power transmission device comprising:
a planetary gear mechanism;
a first rotary machine connected to a sun gear of the planetary gear mechanism;
an engine and a one-way clutch that are connected to a carrier of the planetary gear mechanism;
a second rotary machine and a drive wheel that are connected to a ring gear of the planetary gear mechanism; and
a parking device connected to the ring gear,
wherein the power transmission device is configured to positively rotate the first rotary machine at a time a command to disengage the parking device is received and thereafter disengage the parking device, and
a direction of the positive rotation is a rotational direction of the carrier rotary-driven by the engine.

2. The power transmission device according to claim 1, configured to positively rotate the first rotary machine and disengage the parking device at a time the command to disengage the parking device is received on a climbing road.

3. The power transmission device according to claim 1, further comprising:
an actuator that disengages the parking device; and
a controller configured to electrically control the actuator, wherein the controller positively rotates the first rotary machine at the time the command to disengage the parking device is received and thereafter disengages the parking device by the actuator.

* * * * *